United States Patent [19]

Brodbeck

[11] 4,190,326

[45] Feb. 26, 1980

[54] MOTOR CONTROLLED MIRROR POSITIONING APPARATUS

[76] Inventor: Robert Brodbeck, P.O. Box 806, Littleton, Colo. 80120

[21] Appl. No.: 931,870

[22] Filed: Aug. 7, 1978

[51] Int. Cl.[2] ............................ G02B 5/08; G02B 7/18

[52] U.S. Cl. ...................................................... 350/289

[58] Field of Search ..................... 350/289; 74/501 M; 248/487

[56] References Cited

U.S. PATENT DOCUMENTS

| | | | |
|---|---|---|---|
| 2,718,175 | 9/1955 | Gim | 350/289 |
| 2,877,686 | 3/1959 | Foster | 350/289 |
| 3,075,431 | 1/1963 | White | 350/289 |
| 3,390,937 | 7/1968 | Nicholson | 350/289 |
| 3,429,639 | 2/1969 | Peters | 350/289 |
| 3,576,359 | 4/1971 | Cosh | 350/289 |
| 3,788,734 | 1/1974 | McDuffee | 350/289 |
| 4,050,776 | 9/1977 | Hsu | 350/289 |

*Primary Examiner*—Jon W. Henry
*Attorney, Agent, or Firm*—Richard D. Law

[57] ABSTRACT

A mirror disposed within and protected by a housing that is itself mounted to accommodate major position adjustments rotates and tilts about vertically and horizontally disposed axes to provide minor position adjustments with respect to the mounting axis for the mirror housing. Separate reversible rotate and tilt motors disposed within the housing and controlled by remote switches power such minor positon adjustments. One top or bottom end of the mirror is associated with and interconnected to a bushing establishing one fixed control pivot for localizing rotation and tilting of the mirror, while the opposite end of the mirror may be moved to varied angular positions with respect to said fixed control pivot whereby the mirror is tilted about a horizontal axis. The rotate and tilt motors are variously mounted on the case or on the mirror itself and are interconnected by linkage means to the mirror or to an intermediate shaft in a manner providing movement for the mirror and housing or for the mirror with respect to the housing.

3 Claims, 6 Drawing Figures

MOTOR CONTROLLED MIRROR POSITIONING APPARATUS

BACKGROUND OF THE INVENTION

Many previous inventors have developed apparatus and mechanisms for the remote control of the rear view mirrors that are mounted exteriorly of the passenger compartments of automobiles or trucks. It is acknowledged that mechanical linkage and motor driven types of such mirror control apparatus have previously been provided and used. The earlier developments that have obviously been made in recognition of the potential demand for such capabilities are believed on an overall basis to be less efficient and costlier than the present embodiments of the invention shown and described herein.

SUMMARY OF THE INVENTION

The present invention is primarily adapted for use with the type of rear view mirrors now used on trucks and larger vehicles. The mirrors used for this type of service are generally of substantial size, and, accordingly, a strong and efficient type of apparatus is required to make the minor adjustments in mirror positioning. While predominant components of the present invention embodiments are used to attain minor position adjustments, it should be recognized that major position adjustments can still be made when the mirror assembly is being mounted on the supports attached to the vehicle or its cab, or at later times when such major adjustments are required. Actually the mirror assemblies presented herein are adaptable for replacement installation on the existing mounts and brackets already provided on most truck type vehicles.

In all embodiments of the invention, separate rotate and tilt motors are provided that are interconnected by eccentric drive and linkage components to the mirror element; or to an intermediate shaft connected to the mirror; or to a housing providing a mount for the mirror. The motors are separately energized in forward or reverse directions to change the tilt and rotate position of the mirror about respective horizontal and vertical axes as necessary to change the mirror position for proper viewing.

DESCRIPTION OF THE PREFERRED EMBODIMENTS

Figure 1:
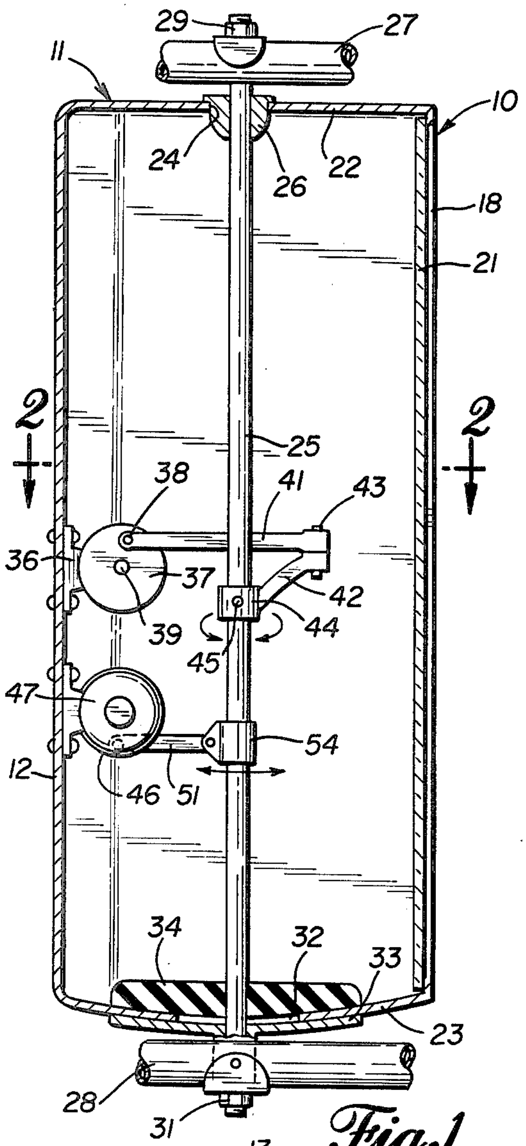
FIG. 1 is a side cross-sectional elevation of a first embodiment of the invention.

In FIG. 1 the rear view mirror 10 has a case 11 that includes a back wall 12, a right side wall 13, a left side wall 14 and intersecting chamfer sections 16 and 17. The front of the case is essentially open except for the return lips 18 and 19 illustrated, which are provided by the main case structure itself or which can be provided by a separate rim (not shown) to facilitate placement and replacement of the mirror 21 closing the front wall portion. In addition to the described walls, the top end 22 and a dished bottom end 23 are provided. The dished bottom end 23 is formed on a radius about a center located in the general position of the top rod receptacle 24 that provides support for a spherical grommet 26 that facilitates rocking movement of the mounting rod 25. In this embodiment of the invention the rod 25 extends through the top and bottom ends 22 and 23 of the case, and threads on the rod ends pass through a mirror mount structure 27 and 28 so the mirror 10 is held in fixed major positions by mounting nuts 29 and 31 that are engageable to the threads on the mounting rod. An opening 32 that may be of elongated, rectangular or of oval shape having a longest axis oriented in a front wall to back wall orientation is provided.

A cover plate 33 positioned exteriorly of the case has a hole through which the rod 25 extends. The cover plate 33 overlaps the opening 32 to prevent entrance of moisture therethrough. For further moisture protection, a rubber or other resilient disk 34 is provided that is positioned against the interior surface of the lower or bottom end 23. This disk itself is engaged about the rod 25, and both the disk 34 and cover plate 33 move with the rod as it moves to varied positions of adjustment with respect to the opening 32 and, accordingly, with respect to the case 11. For this embodiment of the invention the mirror 21 is disposed in a fixed position with respect to the case, and position adjustments of the mirror are made when the entire case is moved.

When making minor adjustment of a mirror assembly 10 in place on a motor vehicle, such as an automobile or truck, it is usually necessary to provide for tilting movements of the mirror element in which the lower end (and/or the upper end the mirror) is moved in and out so that objects on the ground or at higher elevations may be observed. In addition to this required tilting movement, some rotation of the mirror about a vertically oriented axis must be provided so that objects close to the rear of the vehicle or outwardly therefrom may be seen. This required tilting and rotational adjustment for the mirror position is, in this embodiment of the invention, accomplished through provision of a plurality of motors that may be mounted on the case 11 for movement therewith. A rotate motor 36 is shown positioned on the back wall 12 of the case 11 with the axis of the motor being disposed in a horizontal type orientation. An eccentric drive plate 37 on the shaft of the motor has a crank pin 38 that is disposed eccentrically with respect to the output shaft 39 of the motor or of the gear reduction components thereof. When the motor is of a gearhead type, the rotation of the eccentric drive plate 37 will be at a speed less than the rotational speed of the motor armature itself. As the eccentric drive plate 37 is rotated in forward or reverse directions, as controlled by separate switch controls (not shown), a connecting rod 41 will be caused to reciprocate in and out or forwardly and rearwardly along a general line corresponding to that of the front to rear orientation of the mirror case. The connecting rod 41 is joined to a torque arm 42 by a connecting pin 43. Torque arm 42 is mounted on the mounting rod 25 through use of a slip joint bushing 44, and, accordingly, the reciprocal force transmitted by the connecting rod 41 provides a rotative torque force that is exerted by the slip joint bushing 44 to the mounting rod 25. An adjusting screw 45 is provided so that the torque that can be transmitted to the rod 25 by the bushing 44 is adjustable. The adjusting screw should be set so the torque force that is to be transmitted will be adequate to assure rotative movement of the mirror assembly 10 about its vertically disposed axis (herein defined by the mounting rod 25). The slip joint connection is provided at this position, however, since it is quite possible that some unknowing user-driver might try to make manual adjustments of the rotative position of the mirror by forcibly turning the mirror with respect to its mounting rod 25. In order to avoid damage to the interconnecting linkage and to the eccentric drive, the gear reducers and the rotate motor 36 itself, the described slip joint is provided so that such forced position adjustments will not damage the mirror rotating components.

A tilt motor 46 provides the desired tilting movement of the mirror. This motor, which is again mounted on the back 12 of the mirror case 11, provides a gearhead drive for eccentric drive plate 47. Crank pin 48 interconnects the eccentric drive to a crank arm 51 that is pivotally connected to a clip 54 engaged about the rod 25. With this arrangement, as the motor 46 is rotated to power the eccentric drive plate 47, the distance between the tilt motor 46 and the rod will be increased or decreased, and, accordingly, the bottom portion of the mirror assembly 10 will be tilted in and out with respect to the lower mirror mount 28.

For this embodiment of the invention the mounting rod 25 effectively becomes an operative anchor, and the entire case 11 together with the mirror 21 is tilted and rotated with respect thereto. While the rod operates somewhat as an anchor with other components being moved with respect thereto through use of the drive motors 36 and 46, it is true that the provided operative anchor itself is not permanent and absolute. Instead major adjustments in the relative positioning of the mirror assembly 10 can still be made by loosening the nuts 29 and 31 so that the anchor rod 25 can be rotated together with the total mirror assembly 10. Where slots are provided in the mounting components 27 or 28, major tilt movements of the mirror assembly are similarly possible.

In setting up the mirror assembly 10 for use, it is intended that the drive motors and their respective associated eccentrics will be rotated to a somewhat neutral position, and the mirror assembly will then be moved to a zero adjusted position before the securing nuts 29 and 31 are tightened to hold the mirror assembly and anchor rod 25 in this intended zeroed position. After such position has been established, the motors 36-46 can be activated to derive desired minor adjustments in the rotative and tilt positions for the mirror assembly. In this preferred embodiment of the invention, the top rod receptacle 24 and the bushing grommet 26 provide a somewhat fixed control pivot for the assembly.

Figure 3:
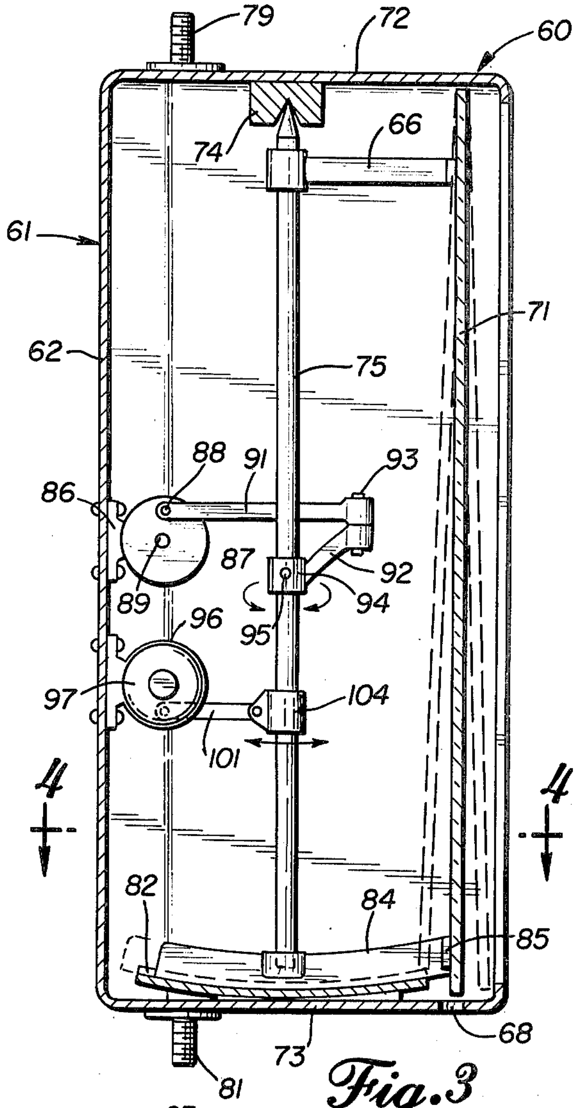
FIG. 3 is a side cross-sectional elevation of a second embodiment of the invention.
Figure 2:
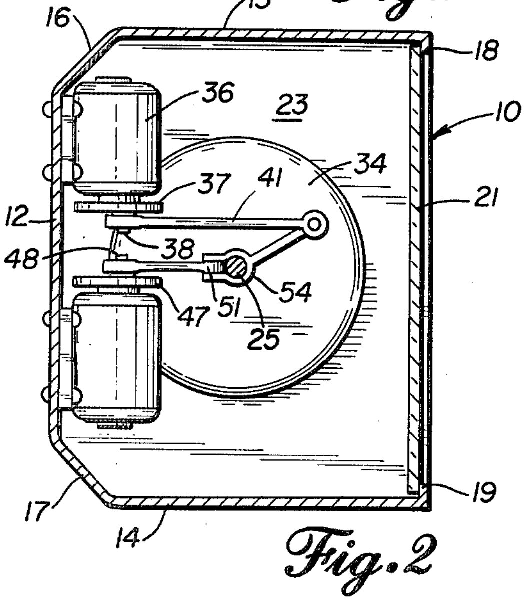
FIG. 2 is a top cross-sectional elevation taken along the line 2—2 of FIG. 1.
Figure 4:
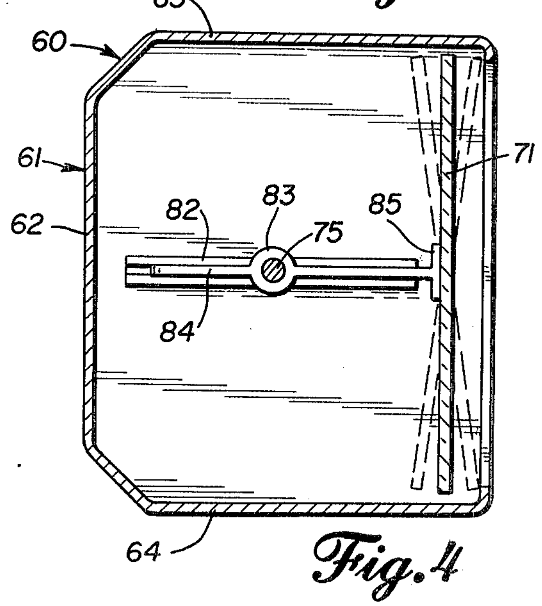
FIG. 4 is a top cross-sectional elevation taken along the line 4—4 of FIG. 3.

A second embodiment of the invention is shown in FIGS. 3 and 4 wherein the total mirror assembly is designated by the number 60. For this embodiment the case 61 is used as the anchor related component, and mirror 71 is moved with respect to the case 61. In general, many structural features for this embodiment are similar to those previously described. A back wall 62 and side walls 63 and 64 are provided together with the top and bottom ends 72 and 73. Stub shafts 79 and 81 extend outwardly from the top and bottom ends 72 and 73, and these stub shafts may be engaged to the top and bottom supports 27 and 28 of the conventional mirror mounting system. A rod 75 is utilized which is free to move relative to the case. A pivot bushing 74 at the top of the case provides a center for turning and tilting movements for rod 75. This element, accordingly, is the fixed control pivot for this mirror assembly 60. A curved track 82 is provided at the bottom of the case, and rod 75 is engaged in a boss 83 of a slide 84 which moves along track 82. Slide 84 extends forwardly, and a foot piece 85 on the slide 84 is engaged to the back of the mirror 71. The guide 82 can itself be moved to rotated positions with respect to the bottom end 73 of the case 61. A mirror support arm 66 extends forwardly from the pivot rod 75 adjacent upper fixed control pivot bushing 74. This support arm 66 is again engaged to the back of the mirror 71, and, accordingly, the mirror 71 moves with the support arm 66, the pivot rod 75 and the lower slide 84. As in the previous embodiment of the invention, rotation of the mirror is accomplished through activation of the rotate motor 86. This motor of gearhead type drives the eccentric plate 87 to move the crank pin 88. The connecting rod 91 interconnects the crank pin and connecting pin 93 to exert a torque force on torque arm 92 and on slip joint 94 as necessary to rotate the pivot rod 75. When the rod 75 is rotated, the mirror will be rotated. Gearhead tilt motor 96 drives eccentric 97 to move connecting rod 101 and clip 104. As in the previous instance, this movement causes the rod 75 to be tilted and, accordingly, accomplishes tilting movements of the mirror 71 which is attached to the rod.

Figure 5:
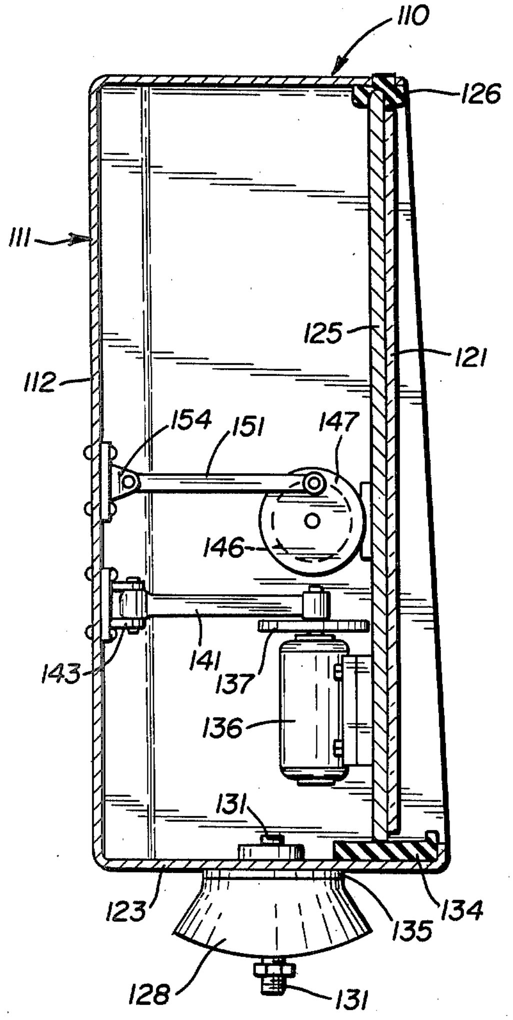
FIG. 5 is a side cross-sectional elevation of a further embodiment of the invention.
Figure 6:
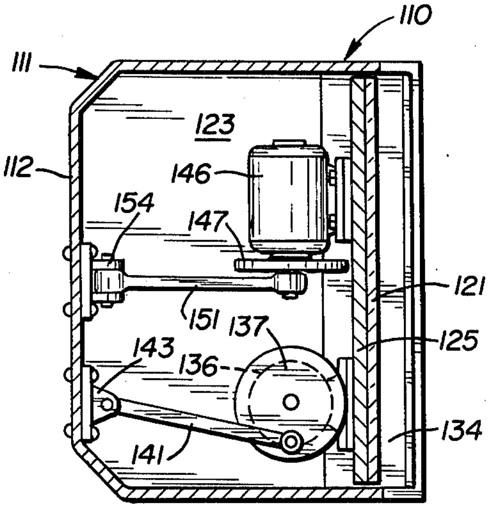
FIG. 6 is a top cross-sectional elevation taken along the line 6—6 of FIG. 5.

For the third embodiment of the invention, as shown in FIGS. 5 and 6, the mirror assembly 110 again comprises a case 111 having a back wall 112. The mirror 121, which is disposed forwardly, is mounted on a backup plate 125. The rotate motor 136 and the tilt motor 146 are mounted on the backup plate 125, and links 141 and 151 interconnect the respective eccentric drives 137 and 147 to anchor pivots 143 and 154, respectively. The anchor pivots 143 and 154 are secured to the back wall 112 of the case 111, and, accordingly, it is this back wall 112 for the entire case which provides the anchor element in this embodiment of the invention. When the rotate motor 136 is energized, the distance between the back wall and the backup mounting plate 125 will be changed. Since the motor 136 is mounted in an eccentric position with respect to the center of the mirror 121, energization of this rotate motor 136 will cause rotation of the mirror 121. The desirable tilt movement for the mirror 121 is derived through operation of the tilt motor 146. For this installation the interconnecting link 151 is disposed on a center line for the mirror, and, accordingly, the mirror will be tilted in and out as this motor is operated.

Seals 126 and 134 are provided at the top and bottom of the case 111 so that excess moisture will not be admitted to the interior of the motor when the mirror is tilted or rotated. The top seal 126 which engages the top end of the mirror has a central boss which extends through the case 111, as illustrated, to provide the fixed center pivot for this assembly. Necessarily, the entire seal 126 rotates with the mirror about such boss when the mirror is rotated by actuation of the rotate motor 136. In mounting this particular mirror, an adapter bushing 128 is utilized. It is intended that the lower surface of the bushing will be engaged with a fender or other structural element on an automobile or truck to support the entire case 111. A flat resilient washer 135 is disposed intermediate the bushing 128 and the lower end 123 of the case. A central mounting bolt 131 extends through the case and the adapter so that the mirror assembly 110 can be secured to the vehicle. Necessarily, major adjustments in the positioning of the mirror assembly 110 may be made through manipulation of the adapter bushing 128 and the mounting bolt 131 when the mirror assembly is being installed. For this combination, the entire case 111 and its mounting adapter 128 provide the operative anchor for the assembly.

What is claimed is:

1. Vehicle rear view mirror positioning apparatus, for making mirror adjustments in rotary and tilt positions for the planar mirror, mounted in a housing having one transparent wall facing the mirror surface, comprising:

(a) generally rectangular housing means having one transparent wall and at least one metal wall, (b) mounting means for said housing including a pair of generally horizontal arms depending outwardly from the vehicle, (c) rear view mirror means mounted in said housing, (d) mirror mounting means including a shaft secured between said arms and extending through said housing means interconnected with said rear view mirror means and arranged to tilt said housing means and said rear view mirror in one plane and rotate said housing means and said rear view mirror in another plane, said housing means being pivotally mounted to the top of said shaft for tilting and rotational movement, (e) a pair of individually activated motors mounted in said housing, and (f) linkage means separately interconnecting said one metal wall and said housing means and said rear view mirror, one said linkage means and motor arranged to tilt said housing means and said mirror on actuation, and the other said linkage means and motor arranged to rotate said housing means and said mirror on actuation.

2. Vehicle rear view mirror positioning apparatus according to claim 1, wherein said shaft is mounted and arranged generally vertically when mounted on a vehicle, and supporting said housing means for tilting and rotate movement, said rear view mirror being secured to said housing means for mounting and movement therewith.

3. Vehicle rear view mirror positioning apparatus according to claim 1, wherein said motors are shafted and include a disc mounted on each shaft, and said motors are mounted at 90 degrees to each other and said linkage means includes a lever arm eccentrically mounted on each disc.

* * * * *